United States Patent
Helmeke et al.

(10) Patent No.: US 8,822,031 B2
(45) Date of Patent: Sep. 2, 2014

(54) HOT MELT MOISTURE CURE ADHESIVE COMPOSITION

(75) Inventors: Marietta B. Helmeke, Little Canada, MN (US); Jeffrey G. Schmierer, Centerville, MN (US); Theresa Unze-Schmierer, Centerville, MN (US)

(73) Assignee: H.B. Fuller Company, St. Paul, MN (US)

( * ) Notice: Subject to any disclaimer, the term of this patent is extended or adjusted under 35 U.S.C. 154(b) by 99 days.

(21) Appl. No.: 13/468,628

(22) Filed: May 10, 2012

(65) Prior Publication Data

US 2012/0288720 A1   Nov. 15, 2012

Related U.S. Application Data

(60) Provisional application No. 61/485,337, filed on May 12, 2011.

(51) Int. Cl.
| | | |
|---|---|---|
| *B32B 27/40* | (2006.01) | |
| *C09J 175/04* | (2006.01) | |
| *C08L 75/04* | (2006.01) | |

(52) U.S. Cl.
USPC .................. 428/423.1; 428/425.1; 156/331.4; 156/332; 525/130

(58) Field of Classification Search
USPC .................. 428/425.1, 423.1; 156/331.4, 332; 525/130
See application file for complete search history.

(56) References Cited

U.S. PATENT DOCUMENTS

| | | |
|---|---|---|
| 4,775,719 A | 10/1988 | Markevka et al. |
| 4,808,255 A | 2/1989 | Markevka et al. |
| 4,820,368 A | 4/1989 | Markevka et al. |
| 4,891,269 A | 1/1990 | Markevka et al. |
| 5,441,808 A | 8/1995 | Anderson et al. |
| 5,939,499 A | 8/1999 | Anderson et al. |
| 6,387,449 B1 | 5/2002 | Ried et al. |
| 7,053,152 B2 | 5/2006 | Krebs et al. |
| 2003/0045636 A1 | 3/2003 | Krebs et al. |
| 2005/0222363 A1 | 10/2005 | Krebs et al. |

FOREIGN PATENT DOCUMENTS

| | | |
|---|---|---|
| WO | WO/91/15530 | 10/1991 |
| WO | WO/03/006569 | 1/2003 |

*Primary Examiner* — Thao T. Tran

(57) ABSTRACT

An adhesive composition that includes: one or more polyester polyether copolymers of formula I:

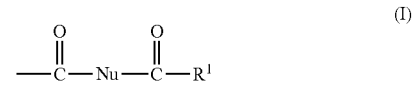

wherein Nu is a predominately cyclic nucleus and $R^1$ is randomly selected from either a $C_{2-6}$ alkylene or an amorphous, long-chain polyether subunit including a polyoxyalkylene group; one or more polyisocyanate prepolymers that includes the reaction product of: one or more polyols; and a polyfunctional isocyanate having a functionality of more than about 2; polymeric MDI; and a first aromatic or aromatic-aliphatic polymer tackifying resin having a softening point of equal to or greater than about 100° C.

20 Claims, No Drawings

HOT MELT MOISTURE CURE ADHESIVE COMPOSITION

CROSS-REFERENCE TO RELATED APPLICATIONS

This application claims the benefit of U.S. Provisional Application No. 61/485,337, filed May 12, 2011 and incorporated herein.

FIELD

The present disclosure relates to adhesive compositions and more specifically adhesive compositions that can be utilized for lamination.

SUMMARY

Disclosed herein are adhesive compositions that include: one or more polyester polyether copolymers of formula I:

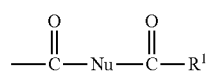
(I)

wherein Nu is a predominately cyclic nucleus and $R^1$ is randomly selected from either a $C_{2-6}$ alkylene or an amorphous, long-chain polyether subunit including a polyoxyalkylene group; one or more polyisocyanate prepolymers that include the reaction product of: one or more polyols and a polyfunctional isocyanate having a functionality of about 2 or more; polymeric MDI; and a first aromatic or aromatic-aliphatic tackifying resin having a softening point greater than or equal to about 100° C.

Disclosed herein are methods of joining at least two substrates, with the method including the steps of applying an adhesive composition onto a surface of at least a first substrate, the adhesive composition including: one or more polyester polyether copolymers of formula I:

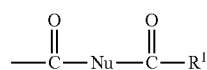
(I)

wherein Nu is a predominately cyclic nucleus and $R^1$ is randomly selected from either a $C_{2-6}$ alkylene or an amorphous, long-chain polyether subunit including a polyoxyalkylene group; one or more polyisocyanate prepolymers that include the reaction product of: one or more polyols and a polyfunctional isocyanate having a functionality of about 2 or more; polymeric MDI; and a first aromatic or aromatic-aliphatic tackifying resin having a softening point greater than or equal to 120° C.; and contacting the applied adhesive composition with a second substrate.

Also disclosed are methods of forming an adhesive composition, the method including the steps of: providing a first composition, the first composition including: a first aromatic or aromatic-aliphatic tackifying resin having a softening point greater than or equal to 100° C.; and one or more polyester polyether copolymers of formula I:

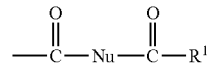
(I)

wherein Nu is a predominately cyclic nucleus and $R^1$ is randomly selected from either a $C_{2-6}$ alkylene or an amorphous, long-chain polyether subunit including a polyoxyalkylene group; and combining the first composition with one or more polyisocyanate prepolymers comprising the reaction product of: one or more polyols and a polyfunctional isocyanate having a functionality of about 2 or more; and polymeric MDI.

DETAILED DESCRIPTION

In the following detailed description it is to be understood that embodiments other than those disclosed herein are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used herein, "have", "having", "include", "including", "comprise", "comprising" or the like are used in their open ended sense, and generally mean "including, but not limited to".

"Exemplary" or "representative" is used in the sense of "for example" or "for the purpose of illustration", and not in a limiting sense.

As used herein "top" and "bottom" are used in relation to each other and are generally defined based on gravity and the way in which the item being discussed is disposed with respect to gravity.

Adhesive compositions disclosed herein can generally include thermoplastic polymers, prepolymer components, isocyanate components and at least one tackifying resin. Adhesive compositions disclosed herein offer advantageous properties, including for example heat resistance and good adhesion.

Polyester Polyether Copolymer

The polyester polyether copolymers can include polymers of formula I:

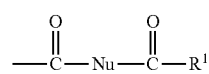
(I)

wherein Nu is a predominately cyclic nucleus and $R^1$ is randomly selected from either a $C_{2-6}$ alkylene or an amorphous, long-chain polyether subunit that includes a polyoxyalkylene group. The nucleus may be derived from a dicarboxylic acid which may be aromatic or aliphatic. The terms "dicarboxylic acid" and "diacid" as used herein are meant to include dicarboxylic acids, diacids, and their equivalents. The aromatic nucleus may be derived from aromatic dicarboxylic acids. Representative aromatic dicarboxylic acids can include for example terephthalic acid, isophthalic acid, phthalic acid, substituted dicarboxy compounds with benzene nuclei such as bis(p-carboxy-phenyl)methane, p-oxy(p-carboxyphenyl)benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like as well as ring substituted derivatives thereof such as $C_{2-10}$ alkyl, halo, alkoxy or aryl derivatives. Hydroxy acids such as p(β-hydroxyethoxy)benzoic acid providing an aromatic dicarboxylic acid can also be utilized.

In embodiments, the precursor to the nucleus can be a methyl ester of the dicarboxylic acid. In embodiments, the nucleus can be derived from dimethyl isophthalate, dimethyl terephthalate, dimethyl cyclohexane dicarboxylate or mixtures thereof. In embodiments, the nucleus can be an aromatic nucleus derived from a mixture of dimethyl isophthalate and dimethyl terephthalate.

The characteristics of $R^1$ determine whether the segment of the copolymer is a hard or a soft segment. In a hard segment, $R^1$ can be a $C_{2-6}$ alkylene group, which can be derived from aliphatic, alicyclic, or aromatic short chain diols with molecular weights of less than about 250. In embodiments, such diols are those with 2-15 carbon atoms such as ethylene, propylene, tetramethylene, isobutylene, pentamethylene, 2,2-dimethyltrimethylene, hexamethylene and decamethyleneglycols, dihydroxycyclohexane, cyclohexane dimethanol, resorcinol, hydroquinone, 1,5-dihydroxynapthalene, and the like. In embodiments, aliphatic dials with 2 to 6 carbon atoms can be utilized. Suitable bisphenols include bis(p-hydroxydiphenyl), bis(p-hydroxyphenyl)methane, bis(p-hydroxyphenyl)methane, propane and 2,2-bis(p-hydroxyphenyl)propane. Equivalent ester forming derivatives of diols are also useful. Such diol derivatives may be used to form the diol in site prior to forming the hard segment.

The soft segments can be formed when $R^1$ is an amorphous, long chain polyether subunit. This subunit can have a molecular weight of about 350 to about 6,000; in some embodiments about 350 to about 3,000; and in some embodiments from about 1,000 to about 3,000. The subunit can have a melting point of less than about 55° C. and a carbon:oxygen ratio of greater than about 2.5:1. Exemplary polyethers can include for example, the poly(alkylene oxide) glycols wherein alkylene is $C_{1-6}$ such as poly(1,2- and 1,3-propylene oxide) glycol, poly(tetramethylene-oxide) glycol, poly(pentamethylene oxide) glycol, poly(hexamethylene oxide) glycol and poly (1,2-butylene oxide) glycol; random or block copolymers of ethylene oxide and 1,2-propylene oxide (used in proportions such that the carbon to oxygen mole ratio in the glycol exceeds 2.5:1) and poly-formals prepared by reacting formaldehyde with glycols, such as pentamethylene glycol, or mixtures of glycols, such as a mixture of tetramethylene and pentamethylene glycols. Again, derivatives of polyols may also be used to form polyether subunits in situ prior to formation of the polyester polyether copolymer.

In embodiments, the polyether subunit can include a polyoxyalkylene polyol having from 2 to 6 carbon atoms in the alkylene group. In embodiments, the polyoxyalkylene polyol comprises polytetramethylene ether glycol (PTMEG). "Polyol" as used herein can include both diols and triols. One class of polyester polyether copolymers can include compositions that have, based on the total weight of the copolymer (A) about 1 to 99 percent by weight of a segmented copolyester elastomer that includes a multiplicity of recurring short chain ester units and long chain ester units joined through ester linkages, said short chain ester units amounting to about 15 to 75 percent by weight of said copolyester and being of the formula II:

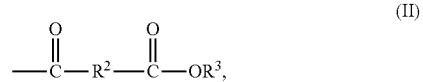

said long chain ester units amounting to about 25 to 85 percent by weight of said copolyester and being of the formula III:

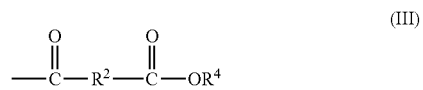

wherein $R^2$ can be a divalent aromatic radical remaining after removal of the carboxyl groups from aromatic dicarboxylic acid having a molecular weight of less than about 350, $R^3$ can be a divalent radical remaining after removal of the hydroxyl groups from an organic diol having a molecular weight of less than about 250, and $R^4$ can be a divalent radical remaining after removal of the terminal hydroxyl groups from long chain glycols or polyalkylene glycols having an average molecular weight of about 350 to 6000, said copolyester having a melt index of less than about 150 and a melting point of at least about 125° C., and (B) about 1 to 99 percent by weight of a low molecular weight thermoplastic resin which can form compatible mixtures with the segmented copolyester, is thermally stable at 150° C., and has a melt viscosity of less than about 10,000 centipoise at 200° C. These compositions are disclosed in U.S. Pat. Nos. 3,832,314; 3,932,326; and 3,959,062 to Hoh et al, which references are incorporated herein by reference thereto. Embodiments can include compositions according to the above formulas wherein $R^2$ is derived from terephthalic acid or a mixture of terephthalic and isophthalic acids, $R^3$ is derived from an organic diol such as butanediol and $R^4$ is derived from a long chain glycol such as polytetramethylene ether glycol (PTMEG).

Exemplary polyester polyether copolymers that may be utilized include for example the HYTREL® line of thermoplastic polyester elastomers from DuPont (Wilmington, Del.).

The polyester polyether copolymers can have a weight average molecular weight (Mw) of greater than or equal to about 75,000; or even greater than or equal to about 100,000. The Mw is determined by GPC (Gel Permeation Chromatography) of the THF (tetrahydrofuran) soluble portion of the polymer versus polystyrene standards.

The amount of polyester polyether copolymers in disclosed adhesive compositions can be chosen based on, final characteristics of the adhesive composition or articles made using the adhesive composition, processing considerations, economic factors, factors not discussed herein, or combinations thereof. The polyester polyether copolymers (of formula I for example) can be present in the adhesive composition at about 5 to about 80 weight percent (wt %), based on the total weight of the adhesive composition; in embodiments at about 5 to about 50 wt %; in embodiments at about 10 to about 35 wt %, and in embodiments at about 10 to about 15 wt %.

Thermoplastic Polymers

Disclosed adhesive compositions can include thermoplastic polymers e.g. vinyl polymers and acrylic polymers.

Representative examples of compatible vinyl polymers can include for example vinyl acetate-ethylene copolymers, ethylene-vinyl acetate copolymers, vinyl alcohol copolymers and ethylene acrylic compounds including for e.g. ethylene acrylate copolymers, ethylene methacrylate, ethylene butylacrylate, and ethylene hydroxyethyl acrylate. Vinyl polymers utilized herein can include high vinyl acetate content ethylene-vinyl acetate copolymer. In embodiments, the ethylene-vinyl acetate copolymer can include about 30 wt % to about 60 wt % vinyl acetate, or even about 40 wt % to about 60 wt % vinyl acetate. Exemplary vinyl polymers that may be utilized can include for example the LEVAMELT® line of ethylene-vinyl acetate copolymers from Lanxess Corporation (Pittsburgh, Pa.).

Acrylic copolymers as defined herein are polymers formed by the polymerization of at least one ethylenically unsaturated monomer capable of free radical polymerization. Representative examples of such monomers can include for example the C1 to C12 esters of acrylic and methacrylic acids including but not limited to methyl acrylate, ethyl acrylate, n-butyl acrylate, isobutyl acrylate, n-propyl or iso-propyl acrylate as well as the corresponding methacrylates.

The amount of thermoplastic polymers in the adhesive composition can be chosen based on, final characteristics of the adhesive composition or articles made using the adhesive composition, processing considerations, economic factors, factors not discussed herein, or combinations thereof. The thermoplastic polymers can be present in the adhesive composition at about 0.01 to about 30 wt %; in embodiments at about 1 to about 30 wt %; in embodiments from about 5 to about 25 wt %; in embodiments from about 5 to about 20 wt %; and in embodiments less than about 10 wt %.

Polyisocyanate Prepolymer

Adhesive compositions disclosed also include a prepolymer component. In embodiments, the prepolymer component can be a polyisocyanate prepolymer which can include the reaction product of one or more polyols and a polyfunctional isocyanate which can have an isocyanate functionality of about 2 or more. Exemplary polyols may include polyether polyols, polyester polyols, or mixtures thereof. The polyether polyol can include a polyoxyalkylene polyol wherein the alkylene is $C_{2-9}$. Representative polyoxyalkylene polyols can include poly(alkyleneoxide) glycols wherein alkylene is $C_{2-9}$ such as poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly (1,2-butylene oxide) glycol; random or block copolymers of ethylene oxide and 1,2-propylene oxide (used in proportions such that the carbon to oxygen mole ratio in the glycol exceeds 2.5) and poly-formals prepared by reacting formaldehyde with glycols, such as pentamethylene glycol, or mixtures of glycols, such as a mixture of tetramethylene and pentamethylene glycols. Additionally, the dicarboxymethyl acids of polyoxyalkylene polyols can be used to form long chain polyols in situ as is known by those skilled in the art.

In embodiments, the polyol of the prepolymer can be the same as a polyol used in the polyester polyether copolymer. In embodiments polytetramethylene ether glycol (PTMEG) can be used in the polyisocyanate prepolymer. PTMEG is commercially available from Invista (Wichita, Kans.) under the trade name TERATHANE®.

When mixtures of polyols are used in the prepolymer, it can be advantageous if the polyols have partial compatibility with the polyester polyether copolymer used in the adhesive composition. Polyester polyols contemplated for use in the prepolymer can include those that are reaction products of various polyols with aromatic or aliphatic dicarboxylic acids and polymers of lactones (e.g., polycaprolactone). Representative examples of the aromatic acids which may be used include teraphthalic acid, isophthalic acid and phthalic anhydride. Representative examples of aliphatic acids include dodecanedioic acid, sebacic acid, adipic acid and glutaric acid. Representative examples of polyols include ethylene glycol, butane diol, neopentylglycol, hexane diol, propylene glycol, dipropylene glycol, diethylene glycol and cyclohexane dimethanol. Commercially available polyester polyols that can be utilized can be obtained under the trade name DYNACOLL™ from Evonik Degussa GmbH, (Essen, Germany).

The isocyanate in the prepolymer can generally be a polyfunctional isocyanate with a functionality of about 2 or more. In embodiments, the functionality can be about 2. The isocyanate may be aromatic or aliphatic. Representative examples of aromatic isocyanates include diphenyl methylene diisocyanate (MDI), tetramethyl xylene diisocyanate, naphthalene diisocyanate, toluene diisocyanate. Representative examples of aliphatic diisocyanates include hexamethylene diisocyanate, isophorone diisocyanate, hydrogenated MDI, dodecane isocyanate, dimer diisocyanate and all polymeric, trimeric isocyanates. In embodiments, the isocyanate can include MDI, tetramethylxylene diisocyanate, isophorone diisocyanate, toluene diisocyanate, hexamethylene diisocyanate or mixtures thereof. In embodiments, the isocyanate can include MDI.

The isocyanate prepolymer may optionally be stripped to less than about 0.5% by weight, or even less than about 0.25% by weight, or even less than about 0.1% by weight isocyanate monomer. One device useful for stripping unreacted isocyanate monomer is a wiped film evaporator. The use of stripped isocyanate prepolymer can result in improved safety in handling the adhesives.

The amount of the prepolymer in the adhesive composition can be chosen based on, final characteristics of the adhesive composition or articles made using the adhesive composition, processing considerations, economic factors, factors not discussed herein, or combinations thereof. In embodiments, the prepolymer can be present in the adhesive composition in amounts from about 20 to about 90 wt % based on the total weight of the adhesive composition; in embodiments from about 20 to about 50 wt % based on the total weight of the adhesive composition; and in embodiments from about 25 to about 50 wt % based on the total weight of the adhesive composition.

Polymeric MDI

Adhesive compositions disclosed herein also include polymeric MDI. Polymeric MDI generally has a functionality that is greater than about 2; in embodiments at least about 2.3; in embodiments greater than about 2.3; and in embodiments about 2.7. The functionality of polymeric MDI can be an indication of the expected cross-link density in end use applications. Polymeric MDI is generally a mixture of isocyanate compounds. In embodiments, polymeric MDI can be a mixture of MDI (a diisocyanate), and higher functionality isocyanate polymers. For example, polymeric MDI can be a mixture of MDI, triisocyanate, tetra-isocyanate, penta-isocyanate, higher homologues, or combinations thereof. Examples of commercially available polymeric MDI can include for example PAPI™ 27 (with a functionality of 2.7) and PAPI™ 94 (with a functionality of 2.3) polymeric MDI, which can both be obtained from Dow Chemical Company (Midland, Mich.); and RUBINATE® M isocyanate obtainable from Huntsman International, LLC (Houston, Tex.).

The amount of polymeric MDI in the adhesive composition can be chosen based on, final characteristics of the adhesive composition or articles made using the adhesive composition, processing considerations, economic factors, factors not discussed herein, or combinations thereof. In embodiments, polymeric MDI can be present in the adhesive composition in amounts greater than or equal to about 10 wt % based on the total weight of the adhesive composition; in embodiments greater than or equal to about 15 wt % based on the total weight of the adhesive composition; and in embodiments greater than or equal to about 20 wt % based on the total weight of the adhesive composition. In embodiments, polymeric MDI can be present from about 10 to about 35 wt % based on the total weight of the adhesive composition; in embodiments from about 15 to about 30 wt % based on the total weight of the adhesive composition; in embodiments from about 20 to about 30 wt % based on the total weight of the adhesive composition and in embodiments at about 25 wt % based on the total weight of the adhesive composition. The polymeric MDI may optionally be stripped to less than about 0.5% by weight, or even less than about 0.25% by weight, or even less than about 0.1% by weight free isocyanate monomer.

Tackifying Resin

Adhesive compositions disclosed herein also include a first aromatic or aromatic-aliphatic tackifying resin and optionally a second tackifying resin. The first aromatic or aromatic-aliphatic tackifying resin and optionally second tackifying resin can be chosen based on compatibility with the adhesive composition, final characteristics of the adhesive composition or articles made using the adhesive composition, processing considerations, economic factors, factors not discussed herein, or combinations thereof.

The tackifying resin can generally be an aromatic or aromatic-aliphatic tackifying resin. Useful tackifying resins can be prepared or derived from any monomer containing an aromatic moiety and a polymerizable ethylenically unsaturated group. Typical examples of aromatic monomers can include styrenic monomers such as styrene, alpha-methylstyrene, vinyl toluene, methoxystyrene, tertiary butyl styrene, chlorostyrene, etc.; indene monomers such as indene, methyl indene, coumarone indene and others; and mixtures thereof. Aromatic-aliphatic tackifying resins can be prepared by polymerizing feed streams containing a mixture of one or more aliphatic monomers in combination with one or more aromatic monomers. Typically aromatic-aliphatic resins can be formed from the exemplary aromatic monomers above and unsaturated petroleum feedstocks which contain $C_{4+}$ monomers. Exemplary mixed aromatic-aliphatic resins can contain $C_{4-6}$ monomers with conjugated di-unsaturation. Typical monomers making up aliphatic hydrocarbon resins can include 1,3-butadiene, cis-1,3-pentadiene, trans-1,3-pentadiene, 2-methyl-1,3-butadiene, 2-methyl-2-butene, cyclopentadiene, and dicyclopentadiene for example.

Exemplary specific tackifying resins can be derived from $C_{4-6}$ diene monomers, styrene monomers, indene monomers, dicyclopentadiene monomers, and combinations thereof. Exemplary tackifying resins can also be derived from styrene monomers, alpha-methylsytrene monomers, vinyl toluene monomers, methoxystyrene monomers, tertiary butyl styrene monomers, and combinations thereof.

In embodiments, the first aromatic or aromatic-aliphatic tackifying resin has an aromatic content of at least about 20 wt %, or even at least about 30 wt % or even at least about 40 wt %. Exemplary commercially available tackifying resins can be made from styrenic monomers and can include the lines of KRISTALEX® hydrocarbon resins, PLASTOLYN® hydrocarbon resins, and ENDEX® resins from Eastman Chemical Co. (Kingsport, Tenn.).

Tackifying resins utilized herein can be categorized by their softening points, for example their ring and ball softening points. In embodiments, the first aromatic or aromatic-aliphatic tackifying resin has a softening point greater than or equal to about 100° C., greater than or equal to about 120° C., greater than or equal to about 130° C., or even greater than or equal to about 140° C. In embodiments, the first aromatic or aromatic-aliphatic tackifying resin can have softening point that is not greater than about 160° C., not greater than about 170° C., from about 120° C. to about 170° C., from about 135° C. to about 160° C., or even from about 140° C. to about 160° C.

In other embodiments, the composition further includes a second tackifying resin. In embodiments, the second tackifying resin has a different softening point than the first aromatic or aromatic-aliphatic tackifying resin. In embodiments, the first aromatic or aromatic-aliphatic tackifying resin has a higher softening point than the second tackifying resin.

In embodiments, the second tackifying resin has a softening point less than about 120° C., in embodiments less than 110° C., in embodiments from about 85° C. to less than about 120° C., in embodiments from about 95° C. to less than about 120° C., in embodiments from about 100° C. to less than about 120° C. and in embodiments from about 100° C. to about 110° C.

In embodiments, the second tackifying resin can function as a compatibilizer for the first aromatic or aromatic-aliphatic tackifying resin. The use of a first aromatic or aromatic-aliphatic tackifying resin and a second tackifying resin may provide articles manufactured with the disclosed adhesive compositions advantageous heat resistant properties. The adhesive compositions may be able to display the advantageous heat resistant properties without the second tackifying resin, but processing considerations, such as compatibility and set speed for example could make it advantageous to utilize both a first aromatic or aromatic-aliphatic tackifying resin and a second tackifying resin.

The total amount of tackifying resin in a disclosed adhesive composition can be chosen based on, final characteristics of the adhesive composition or articles made using the adhesive composition, processing considerations, economic factors, factors not discussed herein, or combinations thereof. In embodiments, the total amount of tackifying resin can range from about 10 to about 50 wt %, based on the total weight of the adhesive composition; in embodiments from about 20 to about 40 wt % based on the total weight of the adhesive composition; and in embodiments from about 25 to about 35 wt % based on the total weight of the adhesive composition.

In embodiments where both a first aromatic or aromatic-aliphatic and a second tackifying resin are included, the amounts of the tackifying resins can be chosen based on compatibility concerns of the adhesive composition, final characteristics of the adhesive composition or articles made using the adhesive composition, processing considerations, economic factors, factors not discussed herein, or combinations thereof. In embodiments, the ratio of the second tackifying resin to the first aromatic or aromatic-aliphatic tackifying resin can range from about 1:4 to about 4:1; in embodiments the ratio can range from about 1:3 to about 3:1; and in embodiments the ratio can range from about 1:1 to about 3:1.

Additional Components

Adhesive compositions disclosed herein may also include additional components. Fillers may be incorporated into the adhesive composition in the form of particulate matter, fibers, or powders. These fillers may be any filler materials which will not interfere with the other components in the adhesive composition. Types of fillers include calcium carbonate, ceramics, glass, silica, quartz, mica, treated clay, titanium dioxide, boron nitrides, graphite, carbon black, asbestos, metals, barium, sulfate, talc, or mixtures thereof. Preferred fillers include calcium carbonate, silica, clay, carbon black, or mixtures thereof. In addition to the above indicated optional components, various other materials may be added to the adhesive composition. These compounds can include for example additional polymers, flow modifiers, wetting agents, catalysts, dyes, inhibitors, antioxidants, UV absorbers, waxes, adhesion promoters (e.g., silane) and other additives.

Also disclosed herein are methods of forming disclosed adhesive compositions. Generally, such a method can include steps of providing a first composition that includes the first aromatic or aromatic-aliphatic tackifying resin, optionally the second tackifying resin, optionally one or more thermoplastic polymers and one or more polyester polyether copolymers; and combining the first composition with a prepolymer component and polymeric MDI. Methods disclosed herein can include forming a first composition and adding the prepolymer component and polymeric MDI to the first composition. The prepolymer component and the polymeric MDI can be added to the first composition substantially simultaneously; alternately they can be added to the first composition in series i.e. one after another. Methods disclosed herein can also include forming a second composition that includes the prepolymer component and the polymeric MDI and combining the first composition and the second composition. The first composition can be added to the second composition, the second composition can be added to the first composition, or it can be a mixture thereof. In embodiments, the first composition can be added to the second composition.

Also disclosed herein are methods of joining at least two substrates. The method can generally include the steps of applying a disclosed adhesive composition onto a surface of at least a first substrate; and contacting the applied adhesive composition with a second substrate. The adhesive composition can be applied onto the surface of at least the first substrate using numerous methods known to those of skill in the art. For example, for use as an adhesive or sealant, a solid composition that includes the components of a disclosed adhesive composition can be placed into a drum or pail. Platen type dispensing equipment or bulk melting systems could then be used to deliver the adhesive to a desired substrate. The adhesive can be applied at elevated temperatures (relative to room temperature), for example about 95° to about 175° C., onto a surface of a substrate. Other commonly used methods of applying an adhesive onto substrates to be joined can also be utilized, including for example bead coating, spray coating, roll coating, or slot dies.

Disclosed adhesive compositions may exhibit sufficient green strength such that external mechanical support is not needed while the adhesive moisture cures to ultimately form the final article. Disclosed adhesive compositions can be cured in the bond line using a variety of mechanisms. The curing reaction occurs between a compound having an available active hydrogen atom and the NCO groups of the polyisocyanate prepolymer and the polymeric MDI. A variety of reactive compounds having free active hydrogens are known in the art including water, hydrogen sulfide, polyols, ammonia, and other active compounds. Such curing reactions can be conducted by relying on the presence of moisture in the atmosphere, or active compounds can be added to the adhesive composition at the bond line.

Substrates suitable for use with disclosed adhesive compositions can include for example glass, metal, polycarbonate, acrylic, ABS, PVC, vinyl, wood, etc. The disclosed adhesive compositions can also be advantageously utilized to manufacture laminated articles. One example of a particular type of laminated article that can be advantageously manufactured using disclosed adhesive compositions is laminated doors. Laminated doors can include three basic components: facings, core, and stiles/rails. Exemplary materials that can be used to make facings include for example wood veneer, wood, steel, fiberglass reinforced plastic (FRP), sheet molded compound (SMC), and high pressure laminates (HPL) that can themselves be made of a myriad of materials. Exemplary materials that can be used to make cores include for example expanded polystyrene (EPS), polyisocyanurate, extruded polystyrene (XPS), a honeycomb structure made of paper and aluminum, particle board (PB), medium density fiberboard (MDF), Agrifiber (any fibrous material generated from agricultural/bio-based products), and minerals such as gypsum. Exemplary materials that can be used to make stiles/rails include for example laminated veneer lumber (LVL), finger joints (FA hardwoods (such as oak for example), and composites that can be made of sawdust and polyethylene. A specific high density mineral composite material that is commercially available is TECTONITE™ from Warm Springs Composite Products (Warm Springs, Oreg.), TECTONITE™ can be obtained in sheet form, pre-cut stiles/rails, banded mineral door cores, raw mineral door cores, and concealed vertical rod stiles (CVRs).

One type of exemplary article that can be manufactured using disclosed adhesive compositions is a fire resistant door. A fire resistant door offers the properties of being able to maintain its structural integrity during a fire test. One type of specific fire door can include a laminated structure and a mineral core. For example, a fire resistant door can include the following laminated construction: HPL facing/MDF crossband/mineral core/high density mineral stiles and rails/MDF crossband/HPL facing. Disclosed adhesive compositions can be utilized to adhere any of the noted substrates to any of the other noted substrates. In embodiments, disclosed adhesive compositions can be utilized to adhere the HPL facing to the MDF crossband; the MDF crossband to the mineral core; the mineral core to the second MDF crossband; the second MDF crossband to the second HPL facing.

Articles manufactured using disclosed adhesive compositions can offer advantageous heat resistant properties. For example, articles such as specific laminated doors, manufactured using disclosed adhesive compositions may be able to pass standard tests for fire resistance. One such test that a fire door manufactured using disclosed adhesive compositions may be able to pass includes UL 10C, the United Laboratories test for "Positive Pressure Fire Tests of Door Assemblies".

EXAMPLES

Materials and Methods

Materials:
TERATHANE® 2000 was obtained from Invista, Wichita, Kans.
DYNACOLL® 7380 was obtained from Evonik Degussa GmbH, Essen, Germany.
LUPRANATE® M was obtained from BASF Corporation, Florham Park, N.J.

MODAFLOW® was obtained from Cytec Industries Inc., Woodland Park, N.J.

IRGANOX® 1010 was obtained from Ciba Specialty Chemicals, Basel, Switzerland.

UVITEX® OB was obtained from Ciba Specialty Chemicals, Basel, Switzerland.

LEVAMELT® 456 was obtained from LANXESS Corporation, Pittsburgh, Pa.

PAPI™ 27 and PAPI™ 94 were obtained from Dow Chemical Company (Midland, Mich.).

KRISTALEX® hydrocarbon resins, PLASTOLYN® hydrocarbon resins, and ENDEX® hydrocarbon resins were obtained from Eastman Chemical Co. (Kingsport, Tenn.).

HYTREL® 3078 was obtained from DuPont (Wilmington, Del.).

Prepolymer

A prepolymer composition (referred to herein as "Prepolymer 1") was made as follows. 38.7 wt % (580.5 g) TERATHANE® 2000, 38.7 wt % (580.5 g) DYNACOLL® 7380, and 0.01 wt % (0.15 g) MODAFLOW® were combined, and mixed under vacuum at 101.7° C. (215° F.). The temperature and mixing were maintained for about 60 minutes at which point the temperature was reduced to about 82.2° C. (180° F.). 22.59 wt % (338.85 g) LUPRANATE® M was then added to the mixture and it was heated to between 82.2° C. (180° F.) to 93.3° C. (200° F.) and maintained for about an hour.

Sample Preparation:

Sample for SAFT Test

A Union Tool Series 15, 16 inch silicone roll coater (Union Tool Corporation, Warsaw, Ind.) was used to apply an adhesive composition to a medium density fiberboard (MDF) having a thickness of about 0.229 cm (0.090 inches). The adhesive composition was applied at a temperature between about 126.7° C. (260° F.) and 137.8° C. (280° F.) to a coating weight of about 107.6 g/m² (10 g/ft²). The adhesive composition was applied to the entire MDF board, and was assembled to a second MDF board with an assembly time of about 10 to 20 seconds to form a 2.54 cm (1 inch) by 2.54 cm (1 inch) bond line. The assembly was cured for about 7 days at 25° C. (77° F.) and 50% relative humidity (RH). The assembly was cut into four 1 inch by 4 inch samples each having a 2.54 cm (1 inch) by 2.54 cm(1 inch) bond line.

Sample for Heat Assessment Test

These samples were prepared similar to the above except that the adhesive composition was applied to the crossband of the MDF and it was bonded to a high pressure laminate (HPL) having a thickness of about 0.109 cm (0.043 inch).

Shear Test:

The shear tests were conducted as follows. Each sample, prepared as above, was suspended from one "tail" in the oven. A weight (the specific mass thereof will be noted in the table) was then attached to the other tail of each of three samples in the shear mode. The samples were suspended in the oven at a constant temperature of 204.4° C. (400° F.). The samples were observed and the time of failure was noted.

Heat Assesment:

A single sandwich of each sample, prepared as above, was also placed in the oven at a constant temperature of 204.4° C. (400° F.). The sample remained in the oven for about 90 minutes. The sample was removed from the oven and any visual signs of delamination were immediately noted (delaminated, hard to pry apart, etc.).

Samples

Comparative Example 1

38.99 wt % (194.95 g) KRISTALEX® 3100, 0.01 wt % (0.05 g) MODAFLOW®, and 0.01 wt % (0.05 g) UVITEX® OB were combined and melted at 176.7° C. (350° F.). The temperature was increased to about 190.6° C. (375° F.) and 10 wt % (50 g) LEVAMELT® 456 was slowly added and the mixture was stirred until it was incorporated. The mixture was placed under vacuum once the LEVAMELT® 456 began to disperse and mixed for 20 minutes. 11 wt % (55 g) HYTREL® 3078 was slowly added and the mixture was stirred until it was incorporated. The mixture was mixed for about 2 hours under vacuum at about 190.6° C. (375° F.). 39.99 wt % (200 g) Prepolymer 1 was added to the mixture causing the temperature to decrease to about 162.8° C. (325° F.). The mixture was stirred under vacuum for about 40 minutes at a temperature of 162.8° C. (325° F.).

Example 1

25.76 wt % (128.8 g) KRISTALEX® 3100, 0.01 wt % (0.05 g) MODAFLOW®, 0.48 wt % (2.4 g) IRGANOX®1010, and 0.01 wt % (0.05 g) UVITEX® OB were combined and melted at 176.7° C. (350° F.). The temperature was increased to about 190.6° C. (375° F.) and 3.40 wt % (17.0 g) LEVAMELT® 456 was slowly added and the mixture was stirred until it was incorporated. The mixture was placed under vacuum once the LEVAMELT® began to disperse, and mixed for 20 minutes. 10.84 wt % (54.2 g) HYTREL® 3078 was slowly added and the mixture was stirred until it was incorporated. The mixture was placed under vacuum at about 204.4° C. (400° F.) and mixed for about 2 hours. 39.5 wt % (197.5 g) of Prepolymer 1 and 20 wt % (100 g) of PAPI™ 27 were added to the mixture causing the temperature to decrease to about 162.8° C. (325° F.). The mixture was stirred under vacuum for about 40 minutes at 162.8° C. (325° F.).

Example 2

Example 2 was prepared similarly to Example 1 except that PAPI™ 94 was used in place of PAPI™ 27.

Example 3

Example 3 was prepared similarly to Example 1 except that 10 wt % (50 grams of KRISTALEX® 3100) was replaced with PLASTOLYN® 290.

Example 4

Example 4 was prepared similarly to Example 1 except that all of the KRISTALEX® 3100 was replaced with PLASTOLYN® 240.

Example 5

Example 5 was a duplicate of Example 1.

Example 6

Example 6 was a duplicate of Example 3.

Example 7

Example 7 was prepared similarly to Example 1 except that 22.20 wt % KRISTALEX® 3100 and 10.00 wt % PLASTOLYN® 290 were used in place of 25.76 wt % KRISTALEX® 3100; the HYTREL® 3078 was increased to 13.55 wt %; the amount of prepolymer was changed from 39.5 wt % to 34.5 wt %; the amount of LEVAMELT® 456 was changed from 3.40 wt % to 4.25 wt %; and the amount of PAPI® 27 was changed from 20 wt % to 15.0 wt %.

Example 8

Example 8 was prepared similarly to Example 1 except that 22.20 wt % KRISTALEX® 3100 and 10.00 wt % PLASTOLYN® 290 were used in place of 25.76 wt % KRISTALEX® 3100; the HYTREL® 3078 was increased to 13.55 wt %.; the amount of prepolymer was changed from 39.5 wt % to 30.5 wt %; the amount of LEVAMELT® 456 was changed from 3.40 wt % to 4.25 wt %; and the amount of PAPI® 27 was changed from 20 wt % to 19.0 wt %.

Example 9

Example 9 was prepared similarly to Example 1 except that 15.76 wt % KRISTALEX® 3100 and 10.00 wt % PLASTOLYN® 290 were used in place of 25.76 wt % KRISTALEX® 3100; the amount of prepolymer was changed from 39.5 wt % to 35.0 wt %; and the amount of PAPI® 27 was changed from 20 wt % to 24.5 wt %.

Example 10

Example 10 was prepared similarly to Example 3 except that ENDEX® 160 was used in place of PLASTOLYN® 290

Example 11

Example 11 was prepared similarly to Example 9 except that ENDEX® 160 was used in place of PLASTOLYN® 290.

Some of the components and amounts thereof in comparative example 1 (C1) and examples 1 through 11 are listed below in Table 1.

TABLE 1

| Ex. No. | Pre Polymer | PAPI ™ 27 | PAPI ™ 94 | KRISTALEX ® 3100 | PLASTOLYN ® 240 | PLASTOLYN ® 290 | ENDEX ® 160 |
|---|---|---|---|---|---|---|---|
| C1 | 39.99 | | | 38.99 | | | |
| 1 | 39.5 | 20.0 | | 25.76 | | | |
| 2 | 39.5 | | 20.0 | 25.76 | | | |
| 3 | 39.5 | 20.0 | | 15.76 | | 10.0 | |
| 4 | 39.5 | 20.0 | | | 25.76 | | |
| 5 | 39.5 | 20.0 | | 25.76 | | | |
| 6 | 39.5 | 20.0 | | 15.76 | | 10.0 | |
| 7 | 34.5 | 15.0 | | 22.20 | | 10.0 | |
| 8 | 30.5 | 19.0 | | 22.20 | | 10.0 | |
| 9 | 35.0 | 24.5 | | 15.76 | | 10.0 | |
| 10 | 39.5 | 20.0 | | 15.76 | | | 10.0 |
| 11 | 35.0 | 24.5 | | 15.76 | | | 10.0 |

The adhesive compositions prepared according to comparative example 1 (C1) and examples 1 through 11 were utilized to prepare samples as discussed above in the methods section. The samples were then subjected to the HEAT ASSESMENT method given above. The results are shown below in Table 2.

TABLE 2

| Ex. No. | Results |
|---|---|
| C1 | Delaminated in Oven |
| 1 | Stayed laminated; hard to pry apart |
| 2 | Delaminated in Oven |
| 3 | Stayed laminated; hard to pry apart |

TABLE 2-continued

| Ex. No. | Results |
|---|---|
| 4 | Stayed laminated in oven; formula incompatible |
| 5 | Stayed laminated; had to pry apart |
| 6 | Stayed laminated; had to pry apart |
| 7 | Stayed laminated; somewhat easy to pry apart |
| 8 | Stayed laminated; slightly difficult to pry apart |
| 9 | Stayed laminated; hard to pry apart |
| 10 | Stayed laminated; hard to pry apart |
| 11 | Stayed laminated; hard to pry apart |

Some of the samples prepared using the various examples (those noted below) were subjected to the SHEAR TEST method described above using various weights. The results are shown below in Table 3.

TABLE 3

| Ex. No. | 2 kg* | 4 kg** | 6 kg |
|---|---|---|---|
| 1 | 120 | 210 | |
| 3 | 120 | 420 | 120 |
| 7 | | 210 | |
| 8 | | 330 | |
| 9 | | 420 | 240 |

*Test was stopped at 120 minutes
**Test was stopped at 420 minutes

Example Article

A laminated door was made using the adhesive composition of Example 9. The door had the following construction. High pressure laminate (HPL) facing/Example 9 adhesive composition/medium density fiberboard (MDF) crossband/Example 9 adhesive composition/mineral core; high density mineral stiles and rails/Example 9 adhesive composition/MDF crossband/Example 9 adhesive composition/HPL facing.

The door was subjected to the UL 10C test, the Positive Pressure Fire Tests of Door Assemblies test as given by Underwriters Laboratories (Northbrook, Ill.) and passed.

Thus, embodiments of HOT MELT MOISTURE CURE ADHESIVE COMPOSITIONS are disclosed. One skilled in the art will appreciate that the leads, extensions, connectors, devices such as signal generators, systems and methods described herein can be practiced with embodiments other than those disclosed. The disclosed embodiments are presented for purposes of illustration and not limitation.

What is claimed is:

1. An adhesive composition derived from:
   (a) one or more polyester polyether copolymers of formula I:

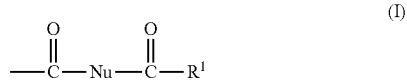

wherein Nu is a predominately cyclic nucleus and $R^1$ is randomly selected from either a $C_{2-6}$ alkylene or an amorphous, long-chain polyether subunit comprising a polyoxyalkylene group;
   (b) one or more polyisocyanate prepolymers comprising the reaction product of:
      one or more polyols; and
      a polyfunctional isocyanate having a functionality of about 2 or more;
   (c) polymeric MDI; and
   (d) a first aromatic or aromatic-aliphatic tackifying resin having a softening point greater than or equal to about 100° C.

2. The adhesive composition of claim 1, wherein the composition addditionally comprises one or more vinyl polymers.

3. The adhesive composition of claim 1, wherein the polymeric MDI is present at about 15 to about 30 weight percent with respect to the total adhesive composition.

4. The adhesive composition of claim 1, wherein the polymeric MDI has a functionality of at least about 2.3.

5. The adhesive composition of claim 1, wherein the composition further comprises a second tackifying resin.

6. The adhesive composition of claim 5, wherein the first aromatic or aromatic aliphatic tackifying resin and the second tackifying resin are independently derived from monomers selected from the group consisting of $C_{4-6}$ diene monomers, styrenic monomers, indene monomers, dicyclopentadiene monomers, and mixtures thereof.

7. The adhesive composition of claim 5, wherein the first aromatic or aromatic-aliphatic tackifying resin and the second tackifying resin are independently derived from styrene monomers, alpha-methylstyrene monomers, vinyl toluene monomers, methoxystyrene monomers, tertiary butyl styrene monomers, and combinations thereof.

8. The adhesive composition of claim 5, wherein the first aromatic or aromatic-aliphatic tackifying resin has a softening point greater than or equal to about 130° C. and the second tackifying resin has a softening point that is from about 85° C. to about 120° C.

9. The adhesive composition of claim 5, wherein the first aromatic or aromatic-aliphatic tackifying resin has a softening point greater than or equal to about 140° C. and the second tackifying resin has a softening point from about 100° to about 110° C.

10. The adhesive composition of claim 5, wherein the ratio of the second tackifying resin to the first aromatic or aromatic-aliphatic tackifying resin can range from about 1:1 to about 3:1.

11. The adhesive composition of claim 1 wherein the polyester polyether copolymer has an Mw greater than or equal to about 100,000.

12. An article formed by laminating two substrates with the adhesive of claim 1.

13. The article according to claim 12, wherein at least one of the substrates comprises high pressure laminate (HPL), medium density fiberboard (MDF), or a high density mineral composite material.

14. The article according to claim 12, wherein the article is a door.

15. The article according to claim 14, wherein the article is a fire resistant door that passes UL 10C.

16. A method of forming an adhesive composition comprising the steps of:
   (a) providing a first composition, the first composition comprising:
      i. a first aromatic or aromatic-aliphatic tackifying resin having a softening point of equal to or greater than about 100° C.; and
      ii. one or more polyester polyether copolymers of formula I:

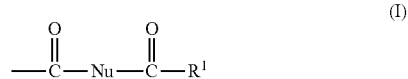

wherein Nu is a predominately cyclic nucleus and $R^1$ is randomly selected from either a $C_{2-6}$ alkylene or an amorphous, long-chain polyether subunit comprising a polyoxyalkylene group; and
   (b) combining the first composition with
      i. one or more polyisocyanate prepolymers comprising the reaction product of:
         one or more polyols; and
         a polyfunctional isocyanate having a functionality of about 2 or more; and
      ii. polymeric MDI.

17. A method of joining at least two substrates, the method comprising:
   (a) applying an adhesive composition onto a surface of at least a first substrate, the adhesive composition comprising:
      i. one or more polyester polyether copolymers of formula I:

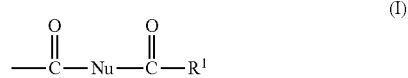

wherein Nu is a predominately cyclic nucleus and $R^1$ is randomly selected from either a $C_{2-6}$ alkylene or an amorphous, long-chain polyether subunit comprising a polyoxyalkylene group;
      ii. one or more polyisocyanate prepolymers comprising the reaction product of:
         one or more polyols; and
         a polyfunctional isocyanate having a functionality of about 2 or more;
      iii. polymeric MDI; and
      iv. a first aromatic or aromatic-aliphatic tackifying resin having a softening point greater than or equal to about 120° C.; and
   (b) contacting the applied adhesive composition with a second substrate.

18. The method of claim 17 wherein the adhesive composition additionally comprises one or more vinyl polymers.

19. The method of claim 17, wherein the polymeric MDI is present at about 10 to about 35 weight percent with respect to the total adhesive composition.

20. The method of claim 17, wherein the adhesive composition further comprises a second tackifying resin having a softening point of less than 120° C.

* * * * *